(12) United States Patent
Kurita et al.

(10) Patent No.: US 10,400,485 B2
(45) Date of Patent: Sep. 3, 2019

(54) DRIVE CONTROL APPARATUS FOR OPENING-AND-CLOSING BODY

(71) Applicant: SHIROKI CORPORATION, Kanagawa (JP)

(72) Inventors: Junya Kurita, Kanagawa (JP); Kenta Ikenori, Kyoto (JP)

(73) Assignee: SHIROKI CORPORATION, Kanagawa (JP)

( * ) Notice: Subject to any disclaimer, the term of this patent is extended or adjusted under 35 U.S.C. 154(b) by 359 days.

(21) Appl. No.: 15/120,390

(22) PCT Filed: Feb. 10, 2015

(86) PCT No.: PCT/JP2015/053594
§ 371 (c)(1),
(2) Date: Aug. 19, 2016

(87) PCT Pub. No.: WO2015/125658
PCT Pub. Date: Aug. 27, 2015

(65) Prior Publication Data
US 2017/0058573 A1    Mar. 2, 2017

(30) Foreign Application Priority Data

Feb. 21, 2014   (JP) .................. 2014-031736

(51) Int. Cl.
*E05B 81/20*   (2014.01)
*E05F 15/622*   (2015.01)
(Continued)

(52) U.S. Cl.
CPC ............. *E05B 81/20* (2013.01); *B60J 5/00* (2013.01); *B62D 25/10* (2013.01); *E05B 81/56* (2013.01);
(Continued)

(58) Field of Classification Search
CPC .......... E05B 81/20; E05B 81/70; E05B 81/56; B62D 25/105
See application file for complete search history.

(56) References Cited

U.S. PATENT DOCUMENTS 4,530,185 A * 7/1985 Moriya ............... E05B 81/20
49/280
5,466,021 A * 11/1995 Ishihara ............... E05B 81/20
292/201
(Continued)

FOREIGN PATENT DOCUMENTS

| JP | 2004-131990 A | 4/2004 |
| JP | 2005-002745 A | 1/2005 |
| JP | 2012-102516 A | 5/2012 |

OTHER PUBLICATIONS

International Search Report dated May 12, 2015, issued in corresponding PCT/JP2015/053594, 1 pages.
(Continued)

*Primary Examiner* — Gregory J Strimbu
(74) *Attorney, Agent, or Firm* — Millen, White, Zelano & Branigan, P.C.; William Nixon

(57) ABSTRACT

A drive control apparatus includes an opening-and-closing body. A first driver drives the opening-and-closing body in a closing direction. A second driver moves the opening-and-closing body from a half-latched position to a fully-latched position. A fully-latched detector detects that the opening-and-closing body has reached the fully-latched position. A stop detector detects whether a predetermined stopping condition has been satisfied for stopping the driving of the opening-and-closing body in the closing direction. A drive controller is configured to drive the opening-and-closing body via the first driver in the closing direction. Upon the fully-latched detector detecting that the opening-and-closing body has reached the fully-latched position, the second
(Continued)

driver ends operation and the first driver continues to drive the opening-and-closing body in the closing direction until the stop detector detects that the predetermined stopping condition is satisfied.

5 Claims, 7 Drawing Sheets

(51) Int. Cl.
*E05B 83/18* (2014.01)
*E05B 85/26* (2014.01)
*E05F 15/70* (2015.01)
*B60J 5/00* (2006.01)
*B62D 25/10* (2006.01)
*E05B 81/56* (2014.01)
*E05B 81/70* (2014.01)
*E05D 5/06* (2006.01)

(52) U.S. Cl.
CPC .............. *E05B 81/70* (2013.01); *E05B 83/18* (2013.01); *E05B 85/26* (2013.01); *E05F 15/622* (2015.01); *E05F 15/70* (2015.01); *E05D 2005/067* (2013.01); *E05Y 2201/22* (2013.01); *E05Y 2201/412* (2013.01); *E05Y 2900/546* (2013.01)

(56) References Cited

U.S. PATENT DOCUMENTS

| | | | |
|---|---|---|---|
| 10,030,431 B2* | 7/2018 | Elie | E05F 15/77 |
| 2004/0070355 A1* | 4/2004 | Ogura | E05B 81/60 |
| | | | 318/280 |
| 2010/0107500 A1* | 5/2010 | Whinnery | E05B 81/20 |
| | | | 49/279 |
| 2017/0218677 A1* | 8/2017 | Ikenori | E05F 15/611 |
| 2018/0179788 A1* | 6/2018 | Oxley | E05F 15/60 |

OTHER PUBLICATIONS

English translation Abstract of JP2004-131990A published Apr. 30, 2004 (2 page).
English translation Abstract of JP2005-002745A published Jan. 6, 2005 (2 page).
English translation Abstract of JP2012-102516A published May 31, 2012 (2 page).

* cited by examiner

DRIVE CONTROL APPARATUS FOR OPENING-AND-CLOSING BODY

TECHNICAL FIELD

The present invention relates to a drive control apparatus of an opening-and-closing body such as, e.g., a power trunk lid, power back door, or a power sliding door, etc., of a vehicle.

BACKGROUND ART

A drive control apparatus of an opening-and-closing body for a vehicle is known, for example, as a power trunk lid having a trunk lid, by which a trunk-opening of the vehicle body is closed from a fully-opened position, a half-latched position and a fully-latched position, in that order. This trunk lid is driven to close from the fully-opened position to the half-latched position by a trunk drive mechanism (first driver), which includes a trunk drive motor (PTL motor), and this trunk lid is drawn in from the half-latched position to the fully-latched position by a closer drive mechanism (second driver), which includes a closer drive motor (LCL motor).

The trunk drive mechanism is configured of, for example, an extendable/retractable drive unit, in which one end and another end thereof is pivotally mounted between the vehicle body and the trunk lid, and is extendably/retractably driven by a trunk drive motor. Accordingly, when the trunk lid is driven to close from a fully-opened position to a half-latched position, a sliding resistance (sliding load) occurs in the extendable/retractable drive unit. Consequently, even when the trunk lid is fully-closed with the trunk lid driven to retract from the half-latched position to the fully-latched position by the closer drive mechanism, the trunk lid lifts up from the peripheral portion of the trunk opening of the vehicle body by an amount corresponding to the sliding resistance that occurs in the extendable/retractable drive unit, deteriorating the appearance thereof.

SUMMARY OF THE INVENTION

Technical Problem

The present invention has been devised in consideration of the above-mentioned problems, and it is an objective to provide a drive control apparatus for an opening-and-closing body which can prevent the opening-and-closing body from protruding upwardly upon being fully closed, caused by a sliding resistance (sliding load) in the drive mechanism that drives the opening-and-closing body in the closing direction, and to improve the appearance upon the opening-and-closing body being fully closed.

Solution to Problem

A drive control apparatus for an opening-and-closing body of the present invention includes an opening-and-closing body for opening and closing an opening; a first driver configured to drive the opening-and-closing body in a closing direction from an arbitrary opening position; a second driver configured to drive the opening-and-closing body to draw in from a half-latched position to a fully-latched position; a fully-latched detector configured to detect that the opening-and-closing body has reached the fully-latched position when the opening-and-closing body is being closed; a stop detector configured to detect whether a predetermined stopping condition has been satisfied for stopping a driving of the opening-and-closing body in the closing direction via the first driver; and a drive controller configured to drive the opening-and-closing body via the first driver in the closing direction, when the fully-latched detector detects that the opening-and-closing body has reached the fully-latched position, after the detection of a fully-latched state until the stop detector detects that a predetermined stopping condition is satisfied. Accordingly, since the drive controller drives the opening-and-closing body in the closing direction via the first driver, after the fully-latched detector detects that the opening-and-closing body is fully latched until the stop detector detects that a predetermined stopping condition is satisfied, the opening-and-closing body can be prevented from protruding upwardly upon being fully closed, caused by a sliding resistance (sliding load) in the first driver, and the appearance upon the opening-and-closing body being fully closed can be improved.

The drive control apparatus for an opening-and-closing body of the present invention can further include a half-latched detector configured to detect that the opening-and-closing body has reached the half-latched position when the opening-and-closing body is being closed. The drive controller drives, via the first driver, the opening-and-closing body in the closing direction from the arbitrary opened position to the half-latched position; upon the half-latched detector detecting that the opening-and-closing body has reached the half-latched position, the second driver commences to draw in the opening-and-closing body to move the opening-and-closing body from the half-latched position to the fully-latched position while the first driver continues to drive the opening-and-closing body in the closing direction; upon the fully-latched detector detecting that the opening-and-closing body has reached the fully-latched position, after the fully-latched detection the second driver ends the drawing in of the opening-and-closing body, and the first driver further continues to drive the opening-and-closing body in the closing direction until the stop detector detects that the predetermined stopping condition is satisfied. Accordingly, even during an automatic closing operation which uses both the first driver and the second driver, since the drive controller drives the opening-and-closing body in the closing direction via the first driver, after the fully-latched detector detects that the opening-and-closing body is fully latched until the stop detector detects that a predetermined stopping condition is satisfied, the opening-and-closing body can be prevented from protruding upwardly upon being fully closed, caused by a sliding resistance (sliding load) in the first driver, and the appearance upon the opening-and-closing body being fully closed can be improved.

In the drive control apparatus for an opening-and-closing body of the present invention, when the fully-latched detector detects that the opening-and-closing body has reached the fully-latched position in a state where the driving of the opening-and-closing body in the closing direction by the first driver and the drawing in of the opening-and-closing body by the second driver have stopped, the drive controller thereafter commences the driving of the opening-and-closing body in the closing direction via the first driver, and the first driver drives the opening-and-closing body in the closing direction until the stop detector detects that the predetermined stopping condition is satisfied. Accordingly, even during a manual closing operation (e.g., in an emergency closing operation) which does not use both the first driver and the second driver, since the drive controller drives the opening-and-closing body in the closing direction via the first driver, after the fully-latched detector detects that the opening-and-closing body is fully latched, commences the driving of the first driver to close the opening-and-closing body until the stop detector detects that a predetermined stopping condition is satisfied, the opening-and-closing body can be prevented from protruding upwardly upon being fully closed, caused by a sliding resistance (sliding load) in the first driver, and the appearance upon the opening-and-closing body being fully closed can be improved.

The drive control apparatus for an opening-and-closing body of the present invention can further include a half-latched detector configured to detect that the opening-and-closing body has reached the half-latched position when the opening-and-closing body is being closed. When the half-latched detector detects that the opening-and-closing body has reached the half-latched position in a state where the driving of the opening-and-closing body in the closing direction by the first driver and drawing in of the opening-and-closing body by the second driver have stopped, the drive controller commences the drawing in of the opening-and-closing body via the second driver so that the opening-and-closing body moves from the half-latched position to the fully-latched position; and when the fully-latched detector detects that the opening-and-closing body has reached the fully-latched position, the drive controller thereafter ends the drawing in of the opening-and-closing body by the second driver, commences the driving of the opening-and-closing body in the closing direction via the first driver, and the first driver drives the opening-and-closing body in the closing direction until the stop detector detects that a predetermined stopping condition is satisfied. Accordingly, even during a closing operation which does not use the first driver but uses the second driver, since the drive controller drives the opening-and-closing body in the closing direction via the first driver, after the fully-latched detector detects that the opening-and-closing body is fully latched until the stop detector detects that a predetermined stopping condition is satisfied, the opening-and-closing body can be prevented from protruding upwardly upon being fully closed, caused by a sliding resistance (sliding load) in the first driver, and the appearance upon the opening-and-closing body being fully closed can be improved.

The drive control apparatus for an opening-and-closing body of the present invention can further include a half-latched detector configured to detect that the opening-and-closing body has reached the half-latched position when the opening-and-closing body is being closed. When the half-latched detector detects that the opening-and-closing body has reached the half-latched position in a state where the driving of the opening-and-closing body in the closing direction by the first driver and the driving of the opening-and-closing body by the second driver have stopped, the drive controller simultaneously commences the driving of the opening-and-closing body in the closing direction by the first driver with the drawing in of the opening-and-closing body by the second driver so that the opening-and-closing body moves from the half-latched position to the fully-latched position; and when the fully-latched detector detects that the opening-and-closing body has reached the fully-latched position, the drive controller thereafter ends the drawing in of the opening-and-closing body via the second driver and continues to drive the opening-and-closing body in the closing direction by the first driver until the stop detector detects that the predetermined stopping condition is satisfied. Accordingly, even during a closing operation which does not use the first driver but uses the second driver, since the drive controller drives the opening-and-closing body in the closing direction via the first driver, after the fully-latched detector detects that the opening-and-closing body is fully latched until the stop detector detects that a predetermined stopping condition is satisfied, the opening-and-closing body can be prevented from protruding upwardly upon being fully closed, caused by a sliding resistance (sliding load) in the first driver, and the appearance upon the opening-and-closing body being fully closed can be improved.

In the drive control apparatus for an opening-and-closing body of the present invention, after the fully-latched detector detects the fully-latched state, the stop detector detects that the predetermined stopping condition has been satisfied out of at least one of a predetermined period of time lapsing, pulse signals indicating a rotational drive of a motor of the first driver not being detected, and a predetermined amount of the pulse signals being counted. Accordingly, the driving of the opening-and-closing body in the closing direction by the first driver, after being detected as fully latched, can be stopped at an appropriate timing. In other words, after the fully-latched detector detects that the opening-and-closing body is fully latched, by satisfying at least one of a predetermined time elapsing, a pulse signal indicating the rotational driving of the motor of the first driver not being detected, and a predetermined value of the pulse signals being counted, the opening-and-closing body can be prevented from protruding upwardly upon being fully closed, caused by a sliding resistance (sliding load) in the first driver, and the appearance upon the opening-and-closing body being fully closed can be guaranteed.

DESCRIPTION OF EMBODIMENTS

Figure 1:
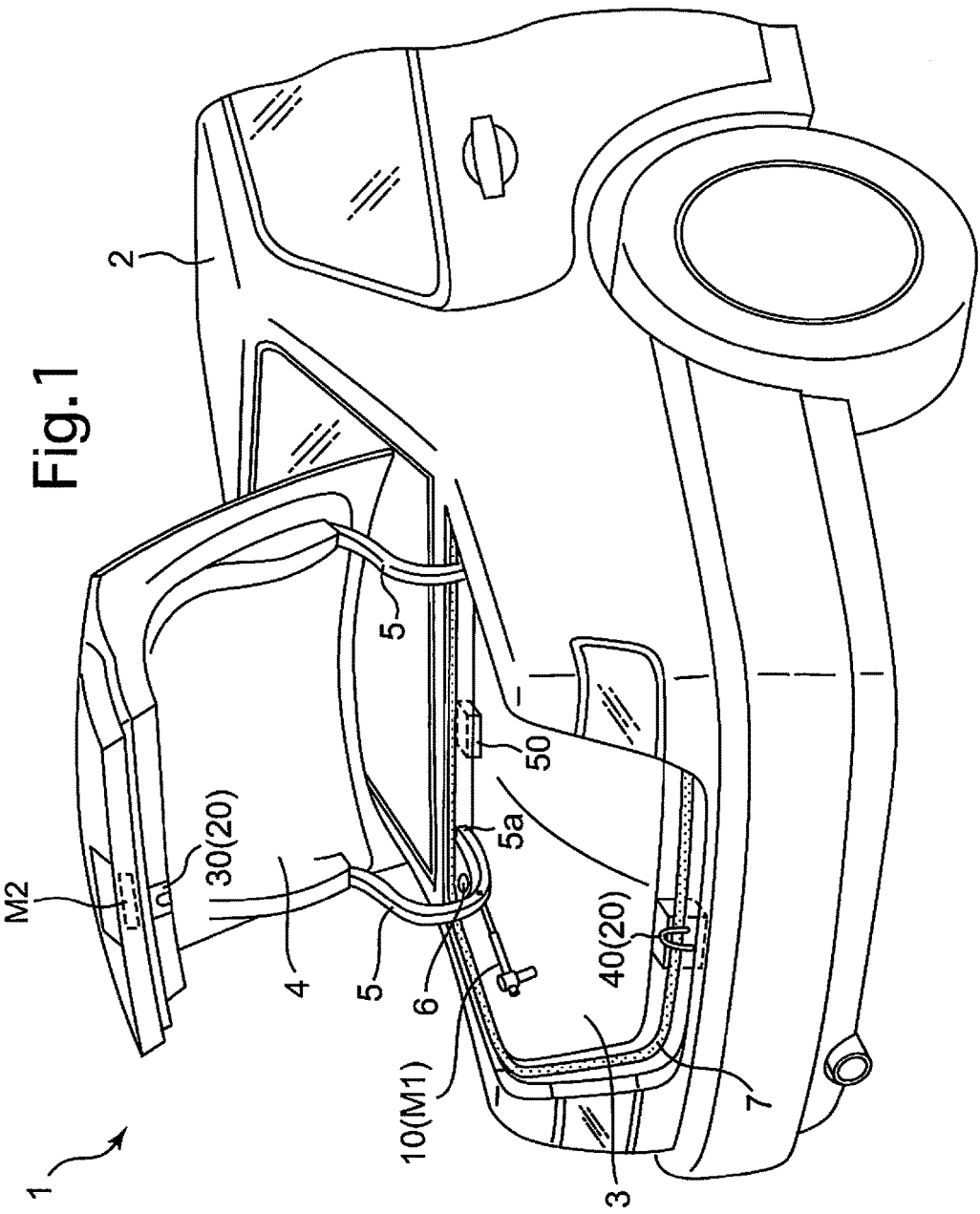
FIG. 1 is a perspective view showing a configuration of a fully-opened position of a power trunk lid, according to the present invention.

An embodiment of a drive control apparatus of an opening-and-closing body, according to the present invention, applied to a power trunk lid 1 will be described hereinbelow with reference to FIGS. 1 through 7. The power trunk lid 1 enables a trunk opening (opening) 3 of a vehicle body 2 to be openable and closable via a trunk lid (opening-and-closing body) 4. The trunk lid 4 is pivotally mounted onto the vehicle body 2 by a pair of hinge members 5 which are arranged in a vehicle leftward/rightward direction, and the trunk lid 4 is openable and closable about pivot shafts 5a of the hinge members 5. A pair of stopper members 6, which correspond to the pair of the hinge members 5 of the trunk lid 4, are provided in a vehicle leftward/rightward direction of the trunk opening 3 of the vehicle body 2 and respectively abut against the pair of hinge members 5 with the trunk lid 4 at a fully-opened position. An entire peripheral edge portion of the trunk opening 3 of the vehicle body 2 is provided with a weather strip 7, which is elastically deformable between the vehicle body 2 and the trunk lid 4 at a fully-closed position of the trunk lid 4, and prevents water from infiltrating into the trunk opening 3.

The power trunk lid 1 is provided with an extendable/retractable drive unit (first driver) 10 which drives the trunk lid 4 to open and close, and in particular, drives the trunk lid 4 in the closing direction from an arbitrary opened position, including the fully-opened position. One end of the extendable/retractable drive unit 10 is pivotally mounted onto a wall surface of the trunk opening 3 of the vehicle body 2 and the other end of the extendable/retractable drive unit 10 is pivotally mounted onto a hinge member 5 of the trunk lid 4; and the extendable/retractable drive unit 10 is extendably and retractably driven by a trunk drive motor (first drive motor) M1.

Figure 2:
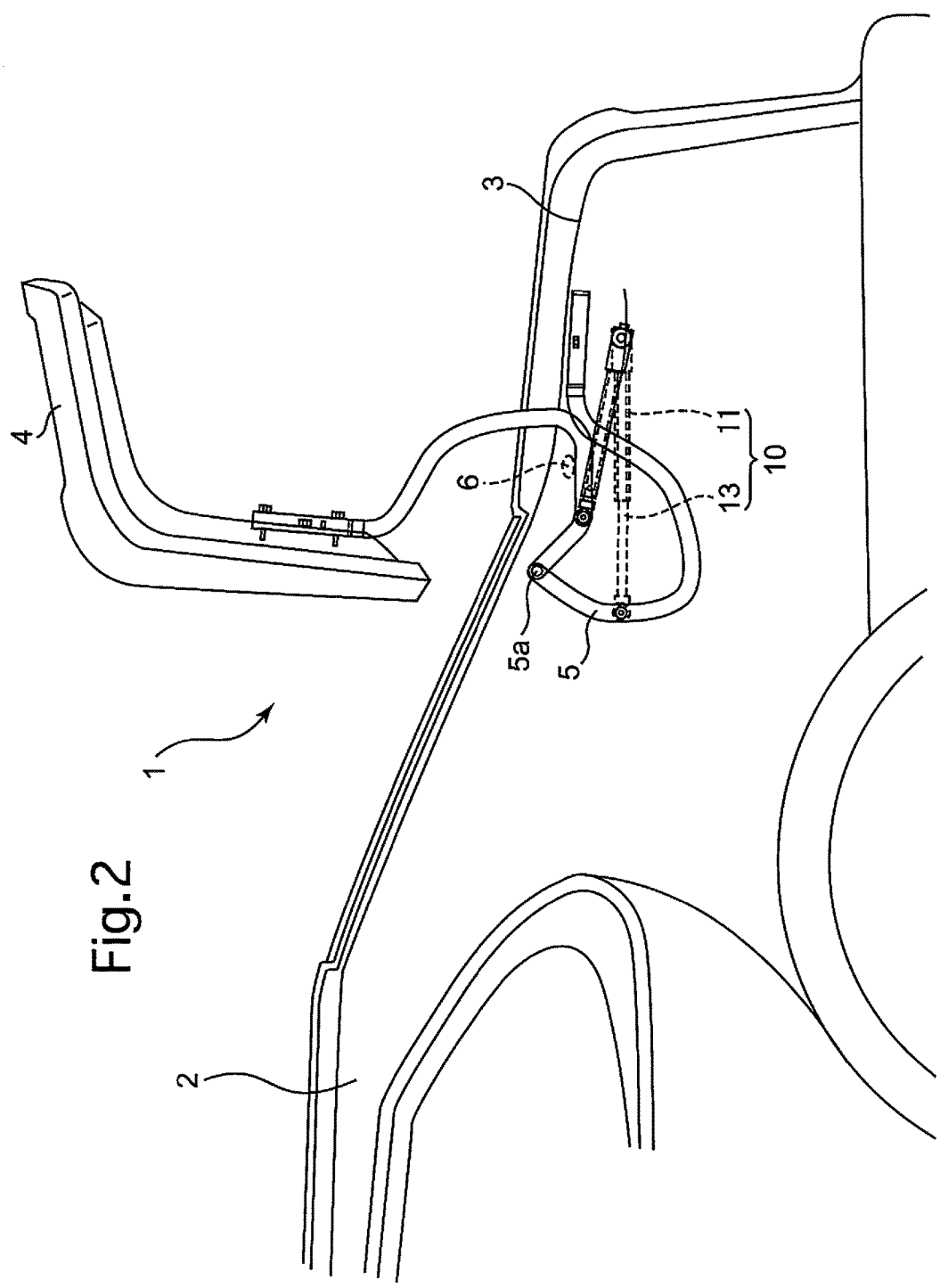
FIG. 2 is a sectional view showing a opening and closing operation of the power trunk lid of FIG. 1.
Figure 3:
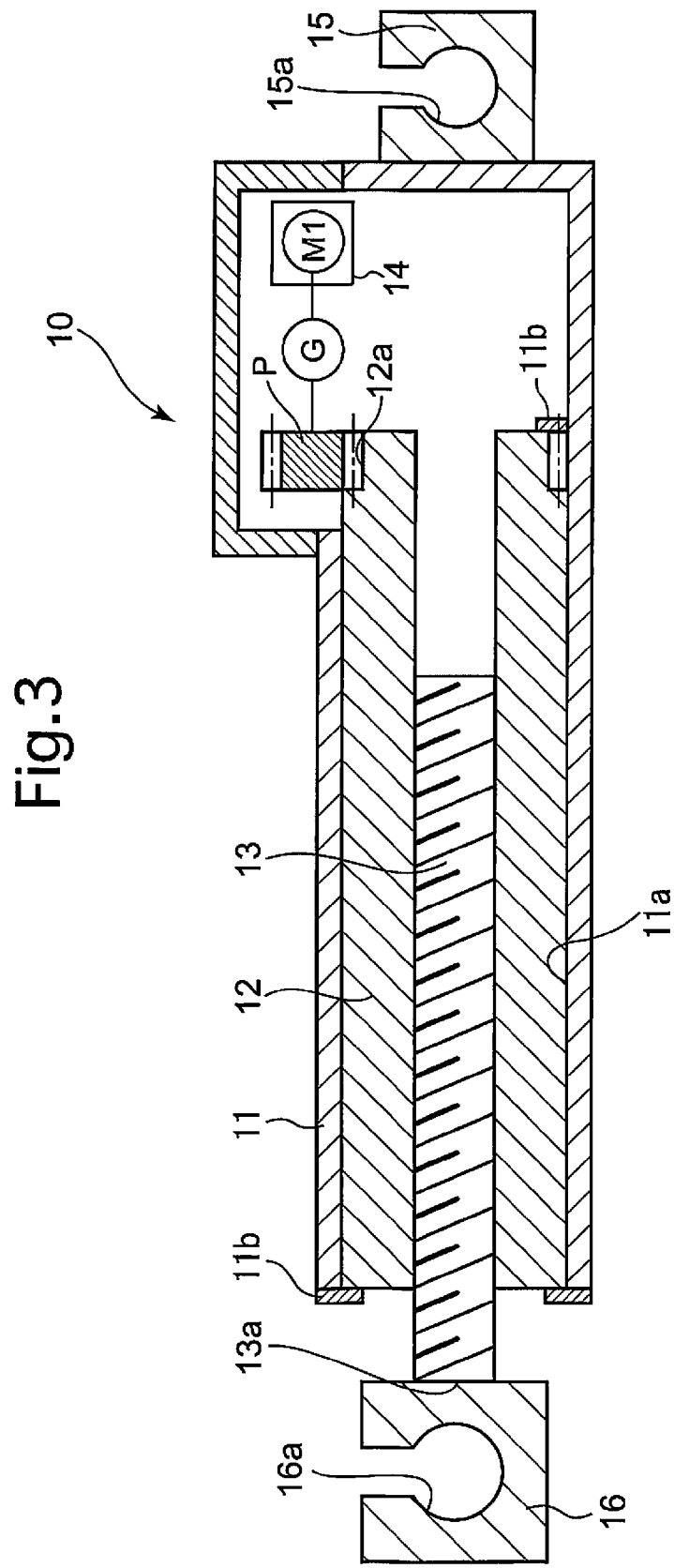
FIG. 3 is a conceptual view showing a unitary construction of an extendable/retractable drive unit (first driver).

As shown in FIG. 3, the extendable/retractable drive unit 10 is provided with a bottomed housing 11, a rotary nut 12 which is screw-engaged with a stopper 11b at an inner cylindrical surface 11a of the bottomed housing 11, and a rod member 13 which is screw-engaged with the rotary nut 12. A regenerative braking circuit 14 (which includes the trunk drive motor M1), a reduction mechanism G and a pinion gear P are provided inside the bottomed housing 11; the pinion gear P is in mesh with an outer peripheral gear 12a of the rotary nut 12. Upon the trunk drive motor M1 of the regenerative braking circuit 14 forwardly/reversibly rotating, the driving force of the trunk drive motor M1 is transferred to the rotary nut 12 via the reduction mechanism G and the pinion gear P, and the rotary nut 12 forwardly/reversibly rotates at a predetermined position within the bottomed housing 11. A rod member 13 is accommodated within the bottomed housing 11 with the rotary nut 12 or projects from the bottomed housing 11 with the rotary nut 12. A joint 15 provided with a ball accommodation portion 15a is connected to the bottomed housing 11. A ball stud (not shown in the drawings), which is provided on the wall surface of the trunk opening 3 of the vehicle body 2, is fitted into the ball accommodation portion 15a. A joint 16 provided with a ball accommodation portion 16a is connected to an end portion 13a of the rod member 13. A ball stud (not shown in the drawings), which is provided on a hinge member 5 of the trunk lid 4, is fitted into the ball accommodation portion 16a. Due to the above-described configuration, the extendable/retractable drive unit 10 operates to open and close the trunk lid 4 by extending and retracting in accordance with the forward/reverse rotation of the trunk drive motor M1 of the regenerative braking circuit 14 (FIG. 2).

The extendable/retractable drive unit 10 can switch between either a inoperative mode (manual operation mode) and an operative mode (electrically-powered operation mode) as an operation mode for opening and closing the trunk lid 4. In the inoperative mode of the extendable/retractable drive unit 10, the regenerative braking circuit 14, provided with the trunk drive motor M1, becomes an open circuit and does not rotatably drive the trunk drive motor M1, so that the trunk lid 4 does not open or close unless an external force (a manual opening/closing operational force, or an external force caused by wind and rain) is applied against the trunk lid 4. In the operative mode of the extendable/retractable drive unit 10, the regenerative braking circuit 14, provided with the trunk drive motor M1, becomes a closed circuit and trunk drive motor M1 rotatably drives the trunk lid 4 in the opening/closing direction, so that the trunk lid 4 automatically opens and closes even if the user does not push the trunk lid 4.

The power trunk lid 1 is provided with a closer drive mechanism (second driver) 20 which drives the trunk lid 4 between the half-latched position and the fully-latched position, and in particular, draws in the trunk lid 4 from the half-latched position to the fully-latched position. The closer drive mechanism 20 is provided with a lock mechanism 30 provided on the trunk lid 4, and a striker 40 provided on the wall surface of the trunk opening 3 of the vehicle body 2.

Figure 4:
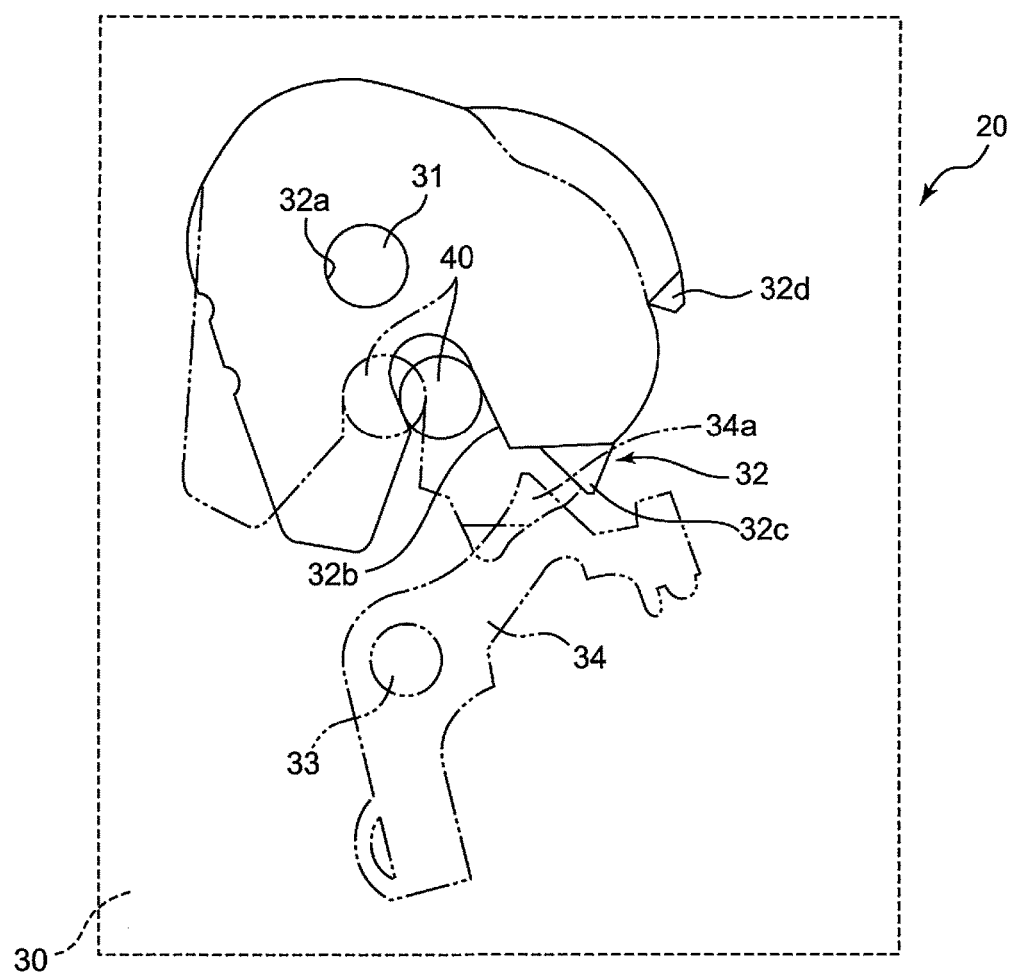
FIG. 4 is a diagram showing a configuration and operation of a closer drive mechanism (second driver).

As shown in FIG. 4, the lock mechanism 30 is provided with a hook 32 which is coupled with a rotational shaft member 31, and a ratchet 34 which is rotatable about a rotational shaft member 33. The hook 32 is provided with a rotational support hole 32a which is rotationally and relatively supported by the rotational shaft member 31, a striker holding groove 32b, a fully-latched engaging portion 32c, and a half-latched engaging portion 32d. The hook 32 is rotatably biased in a clockwise direction (lock-release direction) with respect to FIG. 4 by a spring (not shown in the drawings). The ratchet 34 is provided with a lock portion 34a which is disengagably engagable with the fully-latched engaging portion 32c and the half-latched engaging portion 32d of the hook 32, and the ratchet 34 is rotatably biased in an anticlockwise direction (locking direction) with respect to FIG. 4 by a spring (not shown in the drawings). The above-described hook 32, ratchet 34 and striker 40 respectively hold the trunk lid 4 at the half-latched position and the fully-latched position.

The closer drive mechanism 20 is provided with a closer drive motor (second driver) M2 (see FIG. 1) which rotatably drives the hook 32 forwardly/reversibly. The closer drive mechanism 20 is driven between the half-latched state and the full-latched state by the forward/reverse rotation of the closer drive motor M2. Furthermore, the closer drive mechanism 20 rotates the ratchet 34 at a predetermined timing.

In the present specification, "the half-latched position of the trunk lid 4" refers to an intermediate opened position of the trunk lid 4 when the closer drive mechanism 20 is in a half-latched state, and "the fully-latched position of the trunk lid 4" refers to a fully-closed position of the trunk lid 4 when the closer drive mechanism 20 is in a fully-latched state. Furthermore, "an arbitrary opened position (including a fully-opened position) of the trunk lid 4" refers to an arbitrary opened position (including a fully-opened position) of the trunk lid 4 when the closer drive mechanism 20 is in a released state.

When the trunk lid 4 is at the fully-latched position, the closer drive mechanism 20 is in a fully-latched state in which the striker 40 and the striker holding groove 32b of the hook 32 are engaged with each other and the fully-latched engaging portion 32c of the hook 32 and the lock portion 34a of the ratchet 34 are engaged with each other.

In the case where the closer drive motor M2 is rotated to open the trunk lid 4 from the fully-latched position, the ratchet 34 rotates in the clockwise direction with respect to FIG. 4, the engagement between the fully-latched engaging portion 32c and the lock portion 34a is released, the hook 32 rotates slightly in the clockwise direction by a biasing force of a spring (not shown in the drawings), and the lock portion 34a and the half-latched engaging portion 32d engage with each other. This position is the half-latched position (half-latched state) of the trunk lid 4 obtained via the closer drive mechanism 20.

In the case where the trunk lid 4 is opened from the half-latched position, the ratchet 34 is rotated in the clockwise direction with respect to FIG. 4, the engagement between the lock portion 34a and the half-latched engaging portion 32d is released, the hook 32 further rotates in the clockwise direction by the biasing force of the spring (not shown in the drawings), and the striker 40 escapes from the striker holding groove 32b of the hook 32. In other words, the closer drive mechanism 20 enters a released state.

Figure 5:
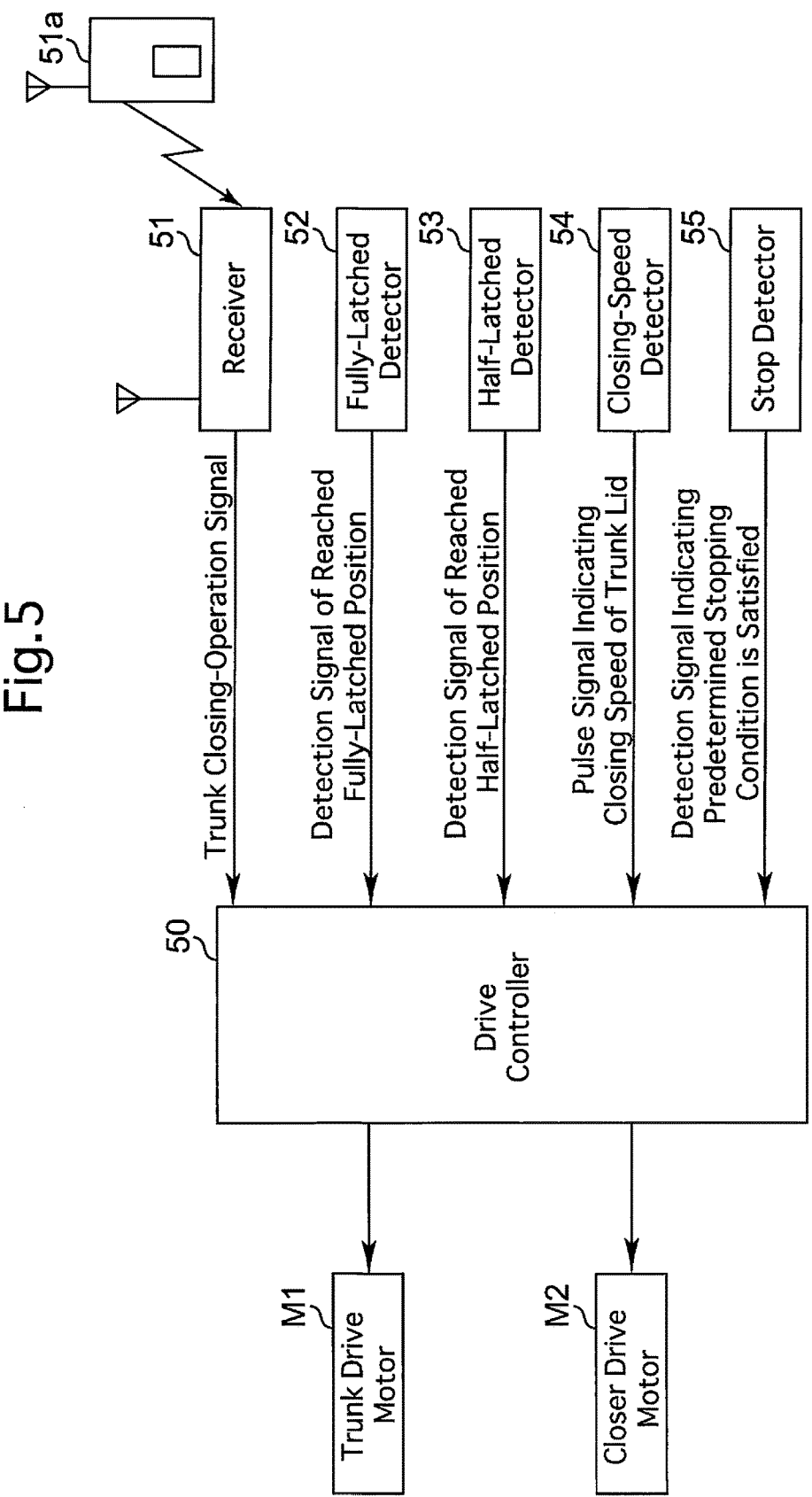
FIG. 5 is a functional block diagram centered around a drive controller of the power trunk lid according to the present invention.

The power trunk lid 1 is provided with a drive controller 50 which carries out the opening and closing drive control of the trunk lid 4 via the extendable/retractable drive unit (first driver) 10 and the closer drive mechanism (second driver) 20, and in particular, carries out the closing drive control of the trunk lid 4 from an arbitrary opened position. As shown in FIG. 5, a receiver 51, a fully-latched detector 52, a half-latched detector 53, a closing-speed detector 54, and a stop detector 55 are connected to the drive controller 50.

The receiver 51 receives a trunk closing-operation signal that is wirelessly transmitted from a wireless remote controller 51a, which is integrally formed with a key, and sends the trunk closing-operation signal to the drive controller 50.

The fully-latched detector 52 detects, when the trunk lid 4 is being closed, that the trunk lid 4 has reached the fully-latched position (that the lock portion 34a and the fully-latched engaging portion 32c have engaged with each other), and sends a detection signal indicating that the fully-latched position has been reached to the drive controller 50.

The half-latched detector 53 detects, when the trunk lid 4 is being closed, that the trunk lid 4 has reached the half-latched position (that the lock portion 34a and the half-latched engaging portion 32d have engaged with each other), and sends a detection signal indicating that the half-latched position has been reached to the drive controller 50.

The closing-speed detector 54 is configured of, e.g., a magnet and a Hall IC (both not shown in the drawings) at the close vicinity of the trunk drive motor M1 of the extendable/retractable drive unit 10, and the closing speed of the trunk lid 4 is detected by the Hall IC converting the magnetic field generated by the magnet into an electrical signal to thereby detect a pulse signal having a pulse width that corresponds to the number of revolutions of the trunk drive motor M1. The closing-speed detector 54 sends the detected closing speed of the trunk lid 4 as pulse signals to the drive controller 50. Furthermore, the movement amount (and also the opened position) of the trunk lid 4 can be measured by counting the number of these pulse signals.

The stop detector 55 detects when a predetermined stopping condition, for stopping the driving of the trunk lid 4 in the closing direction by the extendable/retractable drive unit 10 (trunk drive motor M1), has been satisfied and sends such a detection signal to the drive controller 50.

More specifically, after the fully-latched state has been detected by the fully-latched detector 52, the stop detector 55 detects that a predetermined stopping condition has been satisfied if a predetermined period of time lapses, or pulse signals indicating a rotational drive of the trunk drive motor M1 of the extendable/retractable drive unit 10 are not detected, or if a predetermined amount of pulse signals indicating a rotational drive of the trunk drive motor M1 of the extendable/retractable drive unit 10 is counted.

However, after the fully-latched state has been detected by the fully-latched detector 52, the stop detector 55 can detect that a predetermined stopping condition has been satisfied if two or all three of the following conditions are satisfied: a predetermined period of time lapses, the pulse signals indicating a rotational drive of the trunk drive motor M1 of the extendable/retractable drive unit 10 are not detected, and if a predetermined amount of pulse signals indicating a rotational drive of the trunk drive motor M1 of the extendable/retractable drive unit 10 is counted.

Accordingly, after the fully-latched state has been detected by the fully-latched detector 52, by satisfying at least one condition of a predetermined period of time lapsing, the pulse signals indicating a rotational drive of the trunk drive motor M1 of the extendable/retractable drive unit 10 not being detected, and a predetermined amount of pulse signals indicating a rotational drive of the trunk drive motor M1 of the extendable/retractable drive unit 10 being counted, the trunk lid 4 can be prevented from protruding upwardly, caused by a sliding resistance (sliding load) of the extendable/retractable drive unit 10, so that the appearance upon the trunk lid 4 being fully closed can be guaranteed.

Furthermore, the stop detector 55 can detect that "a predetermined period of time has lapsed after the fully-latched state has been detected by the fully-latched detector 52" by referring to a timer (not shown in the drawings), and can detect that "pulse signals indicating a rotational drive of the trunk drive motor M1 of the extendable/retractable drive unit 10 have not being detected" and "a predetermined amount of pulse signals indicating a rotational drive of the trunk drive motor M1 of the extendable/retractable drive unit 10 have been counted" by referring to the detection results of the closing-speed detector 54.

In the case where the trunk lid 4 is at an arbitrary opened position, the drive controller 50 carries out the following closing drive control upon a trunk closing-operation signal being input from the receiver 51.

Namely, the drive controller 50 drives, via the extendable/retractable drive unit 10 (trunk drive motor M1), the trunk lid 4 in the closing direction from an arbitrary opened position to the half-latched position, and upon the half-latched detector 53 detecting that the trunk lid 4 has reached the half-latched position, the closer drive mechanism 20 (closer drive motor M2) commences to draw in the trunk lid from the half-latched position while the extendable/retractable drive unit 10 (trunk drive motor M1) continues to drive the trunk lid 4 in the closing direction, so that the trunk lid 4 moves from the half-latched position to the fully-latched position. Upon the fully-latched detector 52 detecting that the trunk lid 4 has reached the fully-latched position, after this fully-latched detection, the closer drive mechanism 20 (closer drive motor M2) ends the drawing-in of the trunk lid 4, and the extendable/retractable drive unit 10 (trunk drive motor M1) further continues to drive the trunk lid 4 in the closing direction until the stop detector detects that a predetermined stopping condition is satisfied.

In the case where the trunk lid 4 is at an arbitrary opened position, the drive controller 50 carries out the following closing drive control when, for example, the trunk lid 4 is being closed to the fully-latched position by a manual emergency closing operation.

Namely, when the fully-latched detector 52 detects that the trunk lid 4 has reached the fully-latched position in a state where the closing drive of the trunk lid 4 by the extendable/retractable drive unit 10 (trunk drive motor M1) and the drawing-in of the trunk lid 4 by the closer drive mechanism 20 (closer drive motor M2) have stopped, after the fully-latched state has been detected, the drive controller 50 commences the driving of the trunk lid 4 in the closing direction via the extendable/retractable drive unit 10 (trunk drive motor M1), and the extendable/retractable drive unit 10 (trunk drive motor M1) drives the trunk lid 4 in the closing direction until the stop detector 55 detects that a predetermined stopping condition is satisfied.

In the case where the trunk lid 4 is at an arbitrary opened position, the drive controller 50 carries out the following closing drive control when, for example, the trunk lid 4 is being closed to the half-latched position by a manual closing operation.

Namely, when the half-latched detector 53 detects that the trunk lid 4 has reached the half-latched position in a state where the closing drive of the trunk lid 4 by the extendable/retractable drive unit 10 (trunk drive motor M1) and the drawing-in of the trunk lid 4 by the closer drive mechanism 20 (closer drive motor M2) have stopped, the drive controller 50 commences the drawing-in of the trunk lid 4 via the closer drive mechanism 20 (closer drive motor M2) so that the trunk lid 4 moves from the half-latched position to the fully-latched position; and when the fully-latched detector 52 detects that the trunk lid 4 has reached the fully-latched position, after the fully-latched state has been detected, the drive controller 50 ends the drawing-in of the trunk lid 4 via the closer drive mechanism 20 (closer drive motor M2), commences the driving of the trunk lid 4 in the closing direction via the extendable/retractable drive unit 10 (trunk drive motor M1), and the extendable/retractable drive unit 10 (trunk drive motor M1) drives the trunk lid 4 in the closing direction until the stop detector 55 detects that a predetermined stopping condition is satisfied.

Alternatively, when the half-latched detector 53 detects that the trunk lid 4 has reached the half-latched position in a state where the closing drive of the trunk lid 4 by the extendable/retractable drive unit 10 (trunk drive motor M1) and the drawing-in of the trunk lid 4 by the closer drive mechanism 20 (closer drive motor M2) have stopped, the drive controller 50 simultaneously commences the closing drive of the trunk lid 4 by the extendable/retractable drive unit 10 (trunk drive motor M1) with the drawing-in of the trunk lid 4 via the closer drive mechanism 20 (closer drive motor M2) so that the trunk lid 4 moves from the half-latched position to the fully-latched position; and when the fully-latched detector 52 detects that the trunk lid 4 has reached the fully-latched position, after the fully-latched state has been detected, the drive controller 50 ends the drawing-in of the trunk lid 4 via the closer drive mechanism 20 (closer drive motor M2) and continues to drive the trunk lid 4 in the closing direction via the extendable/retractable drive unit 10 (trunk drive motor M1) until the stop detector 55 detects that a predetermined stopping condition is satisfied.

After the fully-latched detector 52 detects a fully-latched state, when the stop detector 55 detects that a predetermined stopping condition has been satisfied out of the conditions of a predetermined period of time lapsing, pulse signals indicating a rotational drive of the trunk drive motor M1 of the extendable/retractable drive unit 10 not being detected, or a predetermined amount of pulse signals indicating a rotational drive of the trunk drive motor M1 of the extendable/retractable drive unit 10 being counted, the drive controller 50 ends the driving, via the extendable/retractable drive unit 10 (trunk drive motor M1), of the trunk lid 4 in the closing direction.

Next, the closing drive control of the trunk lid 4 via the drive controller 50 will be described hereinbelow with reference to the flowcharts of FIGS. 6 and 7.

Figure 6:
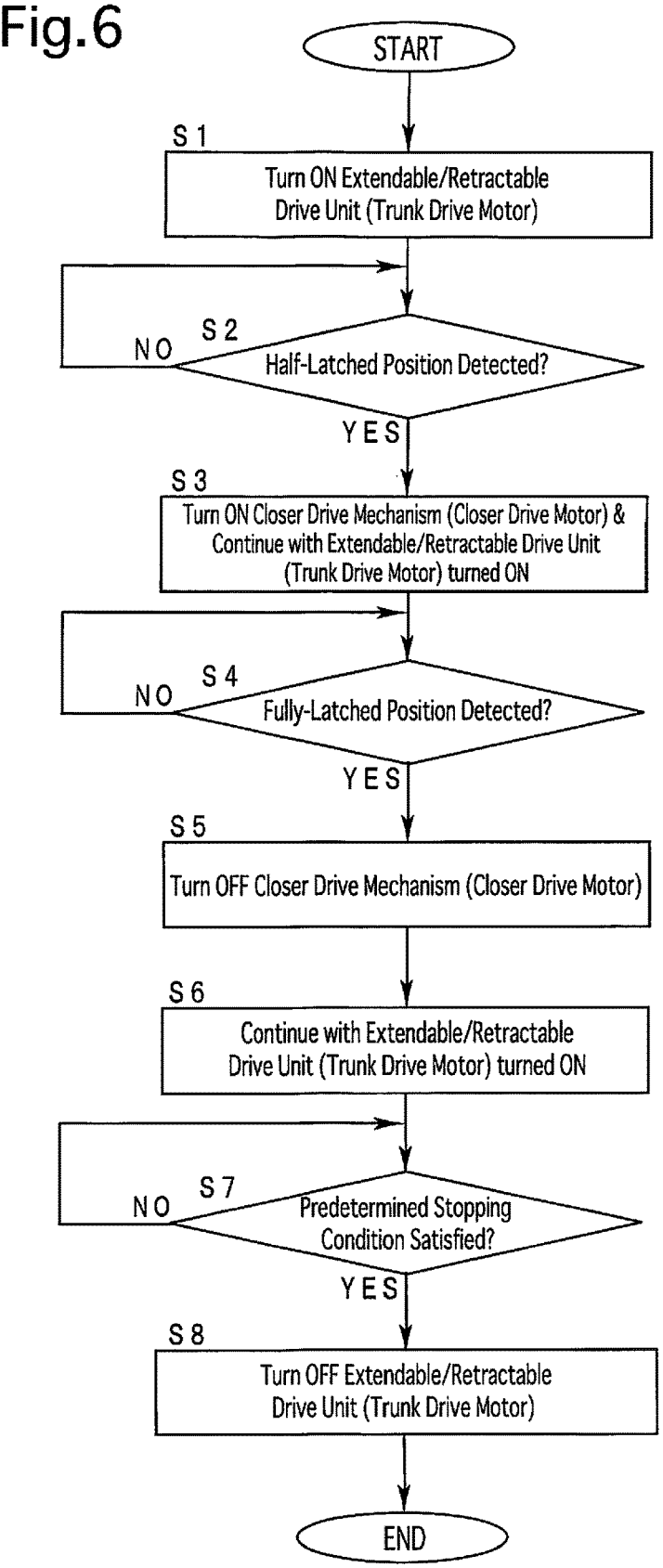
FIG. 6 is a flowchart showing, in the case where the trunk lid is at an arbitrary opened position, the driving control to close the trunk lid via the drive controller upon a trunk closing-operation signal being input from the receiver.

The flowchart in FIG. 6 shows the closing drive control of the trunk lid 4 via the drive controller 50 when a closing-operation signal is input from the receiver 51, in the case where the trunk lid 4 is at an arbitrary opened position.

In the case where the trunk lid 4 is at an arbitrary opened position, upon a closing-operation signal being input from the receiver 51, the drive controller 50 turns ON the extendable/retractable drive unit 10 (trunk drive motor M1), and drives the trunk lid 4 in the closing direction from the arbitrary opened position toward the half-latched position (step S1).

Upon the half-latched detector 53 detecting that the trunk lid 4 has reached the half-latched position (step S2: YES), the drive controller 50 turns ON the closer drive mechanism 20 (closer drive motor M2) while the extendable/retractable drive unit 10 (trunk drive motor M1) continues to drive the trunk lid 4 to close (continues to be turned ON), and draws in the trunk lid 4 from the half-latched position to the fully-latched position (step S3).

Upon the fully-latched detector 52 detecting that the trunk lid 4 has reached the fully-latched position (step S4: YES), the drive controller 50 turns the closer drive mechanism 20 (closer drive motor M2) OFF to end the drawing-in of the trunk lid 4 (step S5), and the extendable/retractable drive unit 10 (trunk drive motor M1) further continues to drive the trunk lid 4 in the closing direction (continues to be turned ON) (step S6).

Upon the fully-latched state being detected by the fully-latched detector 52, the drive controller 50 monitors to determine whether or not the stop detector 55 satisfies a predetermined stopping condition out of a predetermined period of time lapsing, pulse signals indicating a rotational drive of the trunk drive motor M1 of the extendable/retractable drive unit 10 not being detected, or a predetermined amount of pulse signals indicating a rotational drive of the trunk drive motor M1 of the extendable/retractable drive unit 10 being counted (step S7).

When the stop detector 55 detects that a predetermined stopping condition has been satisfied (step S7: YES), the drive controller 50 turns the extendable/retractable drive unit 10 (trunk drive motor M1) OFF, and ends the closing drive, via the extendable/retractable drive unit 10 (trunk drive motor M1), of the trunk lid 4 (step S8). Whereas, when the stop detector 55 does not detect that a predetermined stopping condition is satisfied (step S7: NO), the drive controller 50 continues to drive, via the extendable/retractable drive unit (trunk drive motor M1), the trunk lid 4 in the closing direction.

Figure 7:
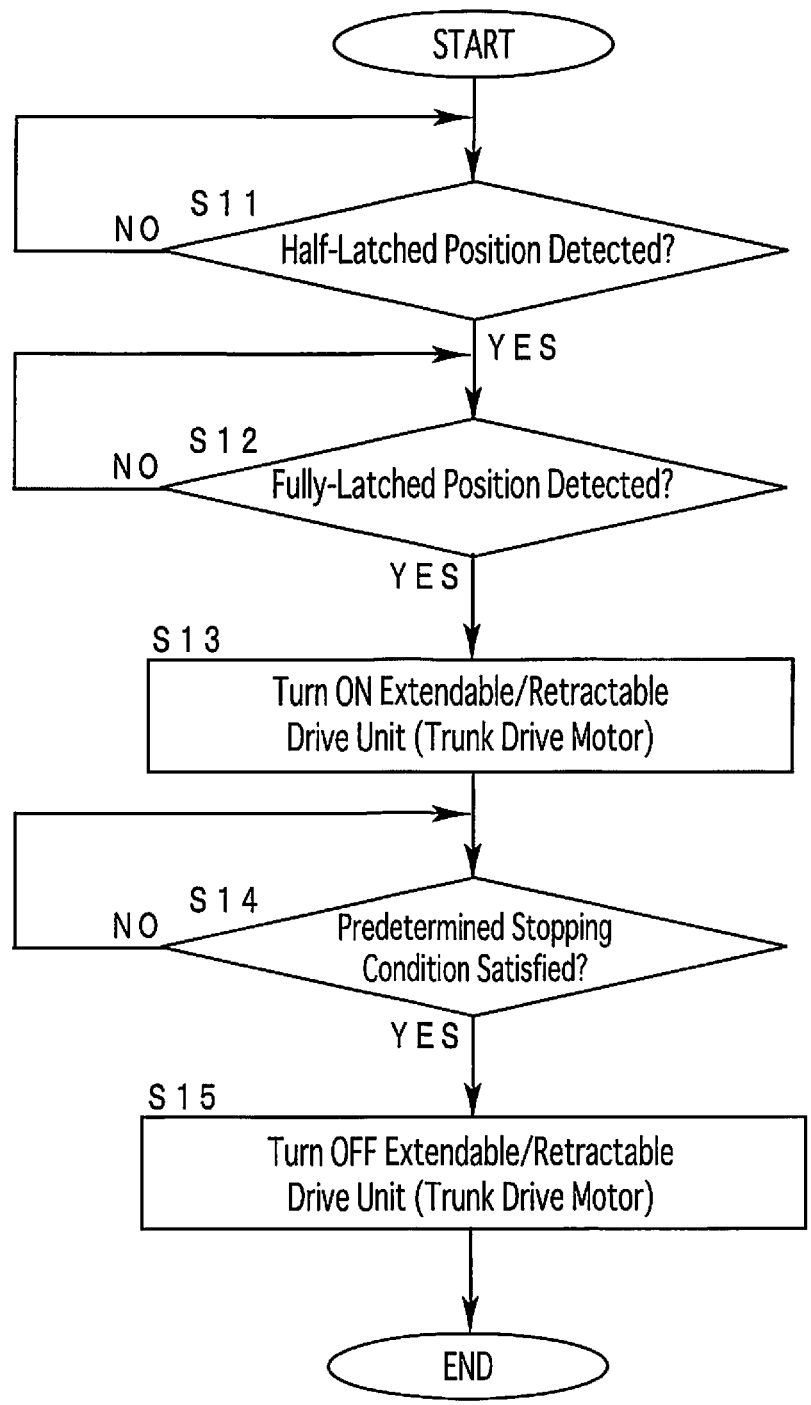
FIG. 7 is a flowchart showing, in the case where the trunk lid is at an arbitrary opened position, the driving control to close the trunk lid via the drive controller upon the trunk lid being closed to the fully-latched position via, e.g., a manual emergency closing operation.

The flowchart in FIG. 7 shows the closing drive control of the trunk lid 4 via the drive controller 50 when, for example, the trunk lid 4 has been closed to the fully-latched position by a manual emergency operation, in the case where the trunk lid 4 was at an arbitrary opened position.

In the case where the trunk lid 4 is at an arbitrary opened position, if, e.g., the trunk lid 4 is manually closed to the fully-latched position by an emergency closing operation, first the half-latched detector 53 detects that the trunk lid 4 has reached the half-latched position (step S11: YES), and subsequently, the fully-latched detector 52 detects that the trunk lid 4 has reached the fully-latched position (step S12: YES).

Thereafter, the drive controller 50 turns ON the extendable/retractable drive unit 10 (trunk drive motor M1), and commences driving of the trunk lid 4 in the closing direction via the extendable/retractable drive unit 10 (trunk drive motor M1) (step S13).

Upon the fully-latched state being detected by the fully-latched detector 52, the drive controller 50 monitors to determine whether or not the stop detector 55 satisfies a predetermined stopping condition out of the conditions of a predetermined period of time lapsing, pulse signals indicating a rotational drive of the trunk drive motor M1 of the extendable/retractable drive unit 10 not being detected, or a predetermined amount of pulse signals indicating a rotational drive of the trunk drive motor M1 of the extendable/retractable drive unit 10 being counted (step S14).

When the stop detector 55 detects that a predetermined stopping condition has been satisfied (step S14: YES), the drive controller 50 turns OFF the extendable/retractable drive unit 10 (trunk drive motor M1), and ends the closing drive, via the extendable/retractable drive unit 10 (trunk drive motor M1), of the trunk lid 4 (step S15). Whereas, when the stop detector 55 does not detect that a predetermined stopping condition is satisfied (step S14: NO), the drive controller 50 continues to drive, via the extendable/retractable drive unit 10 (trunk drive motor M1), the trunk lid 4 in the closing direction.

Hence, according to the power trunk lid (drive control apparatus of an opening-and-closing body) 1 of the present embodiment, when the fully-latched detector 52 detects that the trunk lid (opening-and-closing body) 4 has reached the fully-latched position, since the drive controller 50 drives the trunk lid 4 via the extendable/retractable drive unit (first driver) 10 in the closing direction after the detection of the fully-latched state until the stop detector 55 detects that a predetermined stopping condition is satisfied, the trunk lid (opening-and-closing body) 4 can be prevented from protruding upwardly, caused by a sliding resistance (sliding load) in the extendable/retractable drive unit (first driver) 10 which drives the trunk lid (opening-and-closing body) 4 in the closing direction, and the appearance upon the trunk lid (opening-and-closing body) 4 being fully closed can be improved.

Although the above embodiment has been described using the power trunk lid 1 as an applied example of the drive control apparatus of an opening-and-closing body according to the present invention, the drive control apparatus of an opening-and-closing body of the present invention can also be applied to another drive control apparatus of a vehicle opening-and-closing body, such as a power back door or a power sliding door, etc. Furthermore, the drive control apparatus of an opening-and-closing body can also be applied to a drive apparatus of various other types of opening-and-closing bodies, other than for vehicle use.

INDUSTRIAL APPLICABILITY

The opening-and-closing body according to the present invention is suitable for application in, e.g., a drive apparatus of a vehicle opening-and-closing body such as, e.g., a power trunk lid, a power back door, or a power sliding door, etc., and application in other types of opening-and-closing bodies, other than for vehicle use.

REFERENCE SIGNS LIST

1 Power trunk lid
2 Vehicle body
3 Trunk opening (opening)
4 Trunk lid (opening-and-closing body)
5 Hinge member
5*a* Pivot shaft
6 Stopper member
7 Weather strip
10 Extendable/retractable drive unit (first driver)
M1 Trunk drive motor (first drive motor)
11 Bottomed housing
11*a* Inner cylindrical surface
11*b* Stopper
12 Rotary nut
12*a* Outer peripheral gear
13 Rod member
13*a* End portion
14 Regenerative braking circuit
15 Joint
15*a* Ball accommodation portion
16 Joint
16*a* Ball accommodation portion
G Reduction mechanism
P Pinion gear
20 Closer drive mechanism (second driver)
M2 Closer driver motor (second drive motor)
30 Lock mechanism
31 Rotational shaft member
32 Hook
32*a* Rotational support hole
32*b* Striker holding groove
32*c* Fully-latched engaging portion
32*d* Half-latched engaging portion
33 Rotational shaft member
34 Ratchet
34*a* Lock portion
40 Striker
50 Drive controller
50 Receiver
51*a* Wireless remote controller
52 Fully-latched detector
53 Half-latched detector
54 Closing-speed detector
55 Stop detector

The invention claimed is:

1. A drive control apparatus comprising:
an opening-and-closing body for opening and closing an opening;
a first driver configured to drive said opening-and-closing body in a closing direction from an arbitrary opened position;
a second driver configured to drive said opening-and-closing body from a half-latched position to a fully-latched position;
a fully-latched detector configured to detect that said opening-and-closing body has reached said fully-latched position as said opening-and-closing body is being closed;
a stop detector configured to detect whether a predetermined stopping condition has been satisfied for stopping a driving of said opening-and-closing body in the closing direction via said first driver; and
when said fully-latched detector detects that said opening-and-closing body has reached the fully-latched position, a drive controller is configured to drive said opening-and-closing body via said first driver in the closing direction until the stop detector detects that the predetermined stopping condition is satisfied such that the opening-and-closing body is held in a fully-closed position until the drive controller receives an instruction to open said opening-and-closing body, wherein the predetermined stopping condition includes at least one of
a predetermined period of time lapsing after said opening-and-closing body is detected reaching the fully-latched position, and
pulse signals indicating rotation of a motor of said first driver are not detected.

2. The drive control apparatus according to claim 1, further comprising a half-latched detector configured to detect that said opening-and-closing body has reached said half-latched position when said opening-and-closing body is being closed,
wherein said drive controller is configured to drive, via said first driver, said opening-and-closing body in the closing direction from the arbitrary opened position to said half-latched position;
upon said half-latched detector detecting that said opening-and-closing body has reached said half-latched position, said second driver moves said opening-and-closing body from said half-latched position to said fully-latched position and said first driver continues to drive said opening-and-closing body in the closing direction;
upon said fully-latched detector detecting that said opening-and-closing body has reached said fully-latched position, said second driver ends said moving in of said opening-and-closing body, and said first driver continues to drive said opening-and-closing body in said closing direction until said stop detector detects that the predetermined stopping condition is satisfied.

3. The drive control apparatus according to claim 1, wherein, when said fully-latched detector detects that said opening-and-closing body has reached said fully-latched position and the driving of said opening-and-closing body in said closing direction by said first driver and the driving of said opening-and-closing body by said second driver have stopped, said drive controller thereafter commences the driving of said opening-and-closing body in said closing direction via said first driver, and said first driver drives said opening-and-closing body in the closing direction until said stop detector detects that said predetermined stopping condition is satisfied.

4. The drive control apparatus according to claim 1, further comprising a half-latched detector configured to detect that said opening-and-closing body has reached said half-latched position when said opening-and-closing body is being closed,
wherein, when said half-latched detector detects that said opening-and-closing body has reached said half-latched position and the driving of said opening-and-closing body in said closing direction by said first driver and the driving of said opening-and-closing body by said second driver have stopped, said drive controller commences the driving of said opening-and-closing body via said second driver so that said opening-and-closing body moves from said half-latched position to said fully-latched position; and
when said fully-latched detector detects that said opening-and-closing body has reached said fully-latched position, said drive controller ends the driving of said opening-and-closing body by said second driver and commences the driving of said opening-and-closing body in the closing direction via said first driver such that said first driver drives said opening-and-closing body in said closing direction until said stop detector detects that the predetermined stopping condition is satisfied.

5. The drive control apparatus according to claim 1, further comprising a half-latched detector configured to detect that said opening-and-closing body has reached said half-latched position when said opening-and-closing body is being closed,
wherein, when the half-latched detector detects that said opening-and-closing body has reached said half-latched position and the driving of said opening-and-closing body in said closing direction by said first driver and the driving of said opening-and-closing body by said second driver have stopped, said drive controller simultaneously commences the driving of said opening-and-closing body in said closing direction by said first driver and the driving of said opening-and-closing body by said second driver so that said opening-and-closing body moves from said half-latched position to said fully-latched position; and
when said fully-latched detector detects that said opening-and-closing body has reached said fully-latched position, said drive controller ends the driving of said opening-and-closing body via said second driver and continues to drive said opening-and-closing body in said closing direction by said first driver until said stop detector detects that said predetermined stopping condition is satisfied.

* * * * *